United States Patent Office 3,687,847
Patented Aug. 29, 1972

3,687,847
COMPOSITION AND PROCESS FOR INHIBITING CORROSION IN OIL WELLS
Jim Maddox, Jr., and William Schoen, Houston, Tex., assignors to Texaco Inc., New York, N.Y.
No Drawing. Continuation-in-part of application Ser. No. 649,822, June 29, 1967. This application Mar. 30, 1971, Ser. No. 129,594
Int. Cl. C23f 11/00, 11/14
U.S. Cl. 252—8.55 E
4 Claims

ABSTRACT OF THE DISCLOSURE

Amide condensation products of polymeric acid and 1-aminoalkyl-2-alkyl-2-imidazoline for use in compositions of heavy liquid corrosion inhibitors which may contain weighting agents such as polyhydric alcohols and alkylene carbonates. Continuous or intermittent application of liquid coatings of these inhibitors on metals, particularly ferrous metals, in contact with sweet and sour petroliferous well fluids, form persistent films which afford effective protection against corrosion, even at elevated temperature, in brine or oil and brine mixtures.

This application is a continuation-in-part of our application Ser. No. 649,822, filed June 29, 1967 now Pat. No. 3,623,979.

BACKGROUND OF THE INVENTION

Field of the invention

This invention relates to inhibiting corrosion of metals found in contact with petroliferous well fluids or present in the production of natural gas. It is more particularly concerned with improved heavy liquid compositions used for the prevention of corrosion of metals, particularly ferrous metals in contact with brine or mixtures of oil and brine in oil and gas production, collection, and distribution systems, and in the refinery.

Description of the prior art

The principal corrosive agents found in petroliferous well fluids and in the production of natural gas include hydrogen sulfide, carbon dioxide, oxygen, organic acids, and solubilized salts. These agents may be present individually or in combination with each other. Valves, fittings, tubing, pumps, precipitators, pipe lines, sucker rods, and other components of oil drilling and producing equipment are particularly susceptible to corrosion. Deposits of rust, scale, corrosive by-products, paraffin, and other substances create ideal situations for concentration cells; and, pitting from carbon dioxide or hydrogen sulfide occurs under the covered areas. Acidic condensate that collects on metal tubing in gas condensate wells may also cause pitting. Furthermore, in sour gas or oil fields, it is common for sulfide attack on sucker rods and producing strings to cause deep pits, cracks, or even complete breaks. Downhole well temperatures may exceed 300° F. and accelerate corrosion.

Corrosion that occurs in primary production and water injection systems is rather complex. Evaluation of corrosion inhibitors for such application should include the study of variables such as: composition of water, oils and gases; fluid level of the wells; method and rate of production; water-oil ratio; wetting power of the oil; pH of the well fluids; bottomhole temperatures; quantity of hydrogen sulfide, carbon dioxide, oxygen, and other gases present; formation of the protective coatings such as paraffin from the oil or calcium carbonate from the water; and, composition of inhibitor and method of application.

In order to reduce inventories, achieve cost reduction by volume purchases, and obtain maximum treating effectiveness, a class of corrosion inhibitors, and compositions thereof are required which afford protection to metals in a variety of corrosive environments.

It is therefore a principal object of the present invention to provide a heavy liquid material for addition to sweet and sour petroliferous well fluids where rod and tubing failure from corrosion and cracking and where rod wear and pump corrosion are severe.

Another object of this invention is to provide an improved process for preventing the corrosion of metals in oil and gas production, collection, and distribution systems, and in the refinery.

It is a further object of this invention to provide an improved heavy liquid corrosion inhibitor for use in preventing ferrous metal oil producing apparatus from corroding due to aqueous carbonic acids, sulfides, and soluble aliphatic acids encountered in hot petroliferous well fluids and in the production of natural gas.

A still further object of this invention is to provide a high density liquid corrosion inhibitor for protective coating downhole oil well tubing in contact with brine and oil and brine mixtures.

According to the instant invention, novel oil soluble dispersant free corrosion inhibitors are produced by condensing polymeric acid and 1-aminoalkyl-2-alkyl-2-imidazoline to produce members of a class of N-imidazolinyl-polymeric acid amides having the generic formula

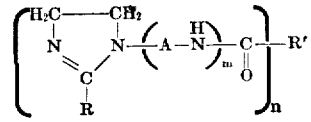

in which R attached to the 2-carbon atom of each imidazoline ring is the residual hydrocarbon radical of a tall oil fatty acid containing from 17 to 32 carbon atoms, and the term residual hydrocarbon radical means all of the fatty acid exclusive of the terminal reacted carboxyl group; A attached to the 1-nitrogen atom of each imidazoline ring is an ethylene group and $m$ is an integer from 1 to 6; R' is the residual hydrocarbon radical of a polymeric acid selected from the group consisting of dimer and trimer fatty acids, and higher molecular weight polymerized carboxylic acids containing from 15 to 70 carbon atoms, and the term residual hydrocarbon radical means all of the polymeric acid exclusive of reacted carboxyl groups; and $n$ is an integer from 1 to 4 and indicates the basicity of the polymeric acid.

The 1-aminoalkyl-2-alkyl-2-imidazoline precursor may be prepared by reacting stoichiometric amounts of a high molecular weight monocarboxylic fatty acid with a polyalkylene polyamine of the formula

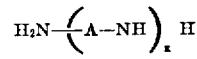

where A is a bivalent ethylene radical and X is an integer from 2 to 7. The fatty acids in a typical high fractionated tall oil consist mainly of a mixture of oleic, linoleic, conjugated linoleic, palmitic, and stearic. One or more of these tall oil fatty acids may be condensed with a polyalkylene polyamine such as diethylenetriamine, triethylenetetramine, and tetraethylenepentamine to provide the 1-aminoalkyl-2-alkyl-2-imidazoline precursor, as described more fully below.

The polymerized carboxylic acids, including dimeric and trimeric acids, and mixtures thereof, which are reacted with the precursor just described to form the products of this invention may be produced by the polymerization of unsaturated fatty acids in accordance with a method such as described in the Journal of the American Oil Chemists Society 24, 65 (1947). Dimerized fatty acids suitable for preparing the amide condensation product of this invention include linoleic and eleostearic dimer acids. In the preparation of polymerized acids, members containing more than 3 moles as polymerized are not commercially feasible; however, the higher members such as tetramers containing 4 or more acid residues may be present in the residues from the preparation of the dimer and trimer acids. These residues containing higher molecular weight polymeric acids are also useful in the preparation of the inhibitors of the invention.

A suitable mixture of polymerized carboxylic acids is available commercially from the Harchem Division, Wallace & Tiernan, Inc., under the trade designation of Century D-75 polymerized carboxylic acids of high molecular weight containing approximately 80% dimer and trimer acids along with higher molecular weight polymeric acids and conforms to the following specifications:

| | |
|---|---|
| Free fatty acid (as oleic), percent | 70-76 |
| Saponification value | 175-185 |
| Iodine value | 45-58 |
| Viscosity, SUS 210° F. | 325-400 |
| Molecular weight (approx.) | 600 |

In concentrations from about 10-200 parts per million, the corrosion inhibiting compositions employed in the practice of this invention are extremely and surprisingly effective in protecting oil and gas well tubing and field equipment from corrosion even at temperatures to 300° F. It is postulated that the corrosion inhibitor forms an adherent protective film on the surface of the metal that resists the penetration of corrosive agents. The polar parts (nitrogen and oxygen) of the inhibitor molecule have an affinity for metal and bond the remainder of the macro molecule to the surface of the metal. The large spacious organic residue constituting the imidazolinyl amide of polymeric acid molecule contributes to the thickness and extent of the film. The NH groups in the molecular chain provide residual buffering power for acidic compounds found in sweet and sour petroliferous well fluids.

Of the many methods of treating wells with corrosion inhibitors, two of the most commonly used may be referred to as Periodic and Continuous treatments. Periodic or batch treatment of pumping wells comprises putting the corrosion inhibitor into the casing and tubing annulus and flushing it to the bottom by diverting the well stream from the flow line into the annulus. Produced fluids then dilute and entrain the inhibitors which coat contacting metal surfaces upon rising to the surface. In continuous treatment a small volume of inhibitor is injected into the production stream used to activate submerged hydraulic pumps in order to maintain a predetermined concentration of inhibitor.

The invention will be further illustrated but is not to be limited by the following specific examples.

EXAMPLE I

To prepare a N-imidazolinylpolymeric acid amide corrosion inhibitor, the 1 - aminoalkyl - 2 - alkyl - 2 - imidazoline precursor was prepared first by refluxing 57.6 grams (0.2 mol) of Acintol FA1 tall oil fatty acid (to be described) and 20.6 grams (0.2 mol) of diethylenetriamine at a temperature of 280° C. for approximately 1.75 hours. During this time, 71% of the theoretical water formed by the reaction was collected. The reaction temperature was then increased to 290° C. and maintained for about 1 hour until 72.6% of the theoretically expected water was recovered. The amine equivalent of the reaction product was 198, but may range from 185 to 225. Progress of the reaction was followed by measuring the amount of water evolved and by inspection of amide (1,660-1,676 cm.$^{-1}$) and imide (1,606-1,620 cm.$^{-1}$) bands in the infrared spectrum.

The imidazoline precursor may be prepared by means of a preferred alternate procedure using a toluene azeotrope to remove approximately all of the theoretical water of reaction in about two hours at a maximum temperature of 240° C.

A N-imidazolinylpolymeric acid amide corrosion inhibitor was prepared by condensing about 1 to 4 mols of a 1-aminoalkyl-2-alkyl-2-imidazoline precursor with about 1 mol of Century D-75 dimer acid. The reaction temperature was held at 150° C. until infrared analysis indicated an increased size of amide band at about 1,660 cm.$^{-1}$. This reaction period took about 15 minutes for small batches. To prepare a corrosion inhibitor having maximum effectiveness it is important that this reaction be carried substantially to completion. This may be accomplished and the temperature of the reaction controlled as well by means of an alternate procedure in which a selective solvent is picked to form an azeotrope having a desired boiling point.

Acintol FA1 used in the preparation of the precursor is a mixture of liquid tall oil fatty acids manufactured by the Arizona Chemical Co. and comprises:

| | Percent |
|---|---|
| Rosin acids | 4.2 |
| Unsaponifiables | 1.6 |
| Fatty acids, total | 94.2 |

The fatty acid composition comprises:

| | Percent |
|---|---|
| Polyunsaturated, conjugated, as linoleic | 8 |
| Polyunsaturated, non-conjugated, as linoleic | 36 |
| Oleic by difference | 52 |
| Saturated | 4 |

Acintol FA1 conforms to the following specification:

| | |
|---|---|
| Specific gravity, 25°/25° C. | 0.91 |
| Acid value | 195 |
| Saponification value | 197 |
| Iodine value (Wijs) | 131 |
| Viscosity, SUS, 100° F. | 100 |
| Flash point, open cup, ° F. | 380 |

EXAMPLE II

The N-imidazolinylpolymeric acid amide of Example I may be formulated into a heavy liquid corrosion inhibitor having a density range of about 9.4 to 9.8 pounds per gallon by mixing said amide with high density solvents and the 1-aminoalkyl-2-alkyl-2-imidazoline precursor as a stabilizer. Such formulations may be used in both sweet and sour wells, whereas those weighted with inorganic salts such as zinc chloride are primarily useful in sweet wells.

The high density corrosion inhibiting composition of the subject invention comprises in percentage by weight.

(a) from about 11 to 13 percent of an amide condensation product of polymeric acid and 1-aminoalkyl-2-alkyl-2-imidazoline represented by the formula

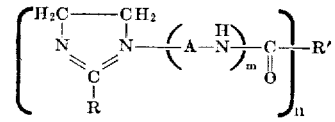

in which R is a tall oil fatty acid residual hydrocarbon radical containing from 17 to 32 carbon atoms; A is a bivalent ethylene radical; $m$ is an integer from 1 to 6; R' is a residual radical of a polymeric acid containing from 15 to 70 carbon atoms and is selected from the group consisting of dimer, trimer, and higher molecular weight polymerized carboxylic fatty acids and mixtures thereof; and $n$ is an integer from 1 to 4;

(b) from about 55 to 65 weight percent of a high density polyhydric alcohol selected from the group comprising glycerol, ethylene glycol, erythritol, or mixtures thereof;

(c) from about 15 to 25 weight percent of a high density alkylene carbonate selected from the group consisting of propylene carbonate, ethylene carbonate, or mixtures thereof; and
(d) from about 7 to 9 weight percent of a stabilizer comprising 1-aminoalkyl-2-alkyl-2-imidazoline.

Typical formulations are shown in Table I. A minimum concentration by weight of inhibitor to well fluids of 10 parts per million is suggested.

TABLE I

| | Effective concentration | Preferred formulation "P" |
|---|---|---|
| N-imidazolinylpolymeric acid amide | 11 to 13 | 12.0 |
| Glycerol | 30 to 40 | 40.0 |
| Ethylene glycol | 15 to 25 | 20.0 |
| Propylene carbonate | 15 to 25 | 20.5 |
| Tall oil imidazoline | 7 to 9 | 7.5 |

The heavy corrosion inhibitor sinks through the fluids present in the well to the bottom. The organic inhibitor disperses into the well fluids, forming a film on the metal tubing as the fluid rises in the well bore. The quantity of heavy liquid inhibitor used depends on such factors as the depth of the well and the height of fluids in the tubing. In general it is estimated that about 5 to 55 gallons of corrosion inhibitor would be required for each well in order to assure that the chemical reaches the bottom of the tubing.

Dynamic tests simulating field usage were used to evaluate the corrosion inhibitors of this invention for their ability to protect metals immersed either in sweet or sour fluids. Two methods of well treatment simulated by these tests are "Continuous Exposure" or constant concentration and "Persistent Filming" for intermittent high concentration additions. A description of the test procedures follows.

General Test Procedure: A sand blasted mild steel test specimen, 3" x 0.5" x 0.005" thick is weighed and inserted in a four ounce glass bottle containing 100 ml. of a filming mix. 1 ml. of 6% acetic acid is added to each bottle containing water or brine in the filming mix. The bottles are then attached to the spokes of a 23-inch diameter vertically mounted wheel and rotated for the time specified below at 30 r.p.m. in an oven maintained at 120° F. for sour filming mixes and 160° F. for sweet filming mixes. As the wheel revolves, the filming mix passes back and forth over the test specimen. At the end of the test period, the test specimen is removed from the bottle, washed with dilute acid, scrubbed with scouring cleanser, and reweighed. From the specimen weight loss, area, metal density, and time of exposure, calculations are made and test results are reported as the "Corrosion Penetration Rate" in mils per year (m.p.y.).

Simulation of Continuous Treatment: Continuous addition of inhibitor is the oldest type of corrosion control treatment for wells producing hydrocarbons and water and in water-injection systems. Metal to be protected is continuously contacted with low concentrations of inhibitor in the range of about 10 to 100 p.p.m., basis total fluids. In the "Continuous Exposure Test," continuous well treatment is simulated in the laboratory by testing a fixed concentration of 25 p.p.m. of inhibitor in a mixture of 10% light gas oil and 90% brine. Sweet and sour environments are simulated by saturating the filming mixes respectively with carbon dioxide and hydrogen sulfide. The concentration of 25 p.p.m. is within the 10 to 100 p.p.m. mentioned previously and constitutes a severe test for most inhibitors. Steel test specimens are exposed to the filming inhibitor mix for 72 hours, in accordance with the general test procedure described above.

Simulation of Persistent Filming Treatment: Many producing wells, and some water injection systems are treated periodically with high concentration mixes that are diluted during application with produced brine or oil, freshwater, or refined hydrocarbon. For example, a mix of a few gallons of inhibitor in a few barrels of diluent injected into the annulus of a nearly "pumped-off" well may reach the downhole pump with little change in concentration. As the pump lifts the filming inhibitor mix up the tubing, the mix diluted by the production will treat the pump, rods, and tubing walls. In effect, the extremes of inhibitor concentration may range from nearly full strength to considerably lower concentrations, depending upon the rate of production. In such treatment, corrosion inhibitor effectiveness depends upon the persistence of the film initially formed on the metal surface.

The "Persistent Filming Test" comprises three consecutive steps: In the first or filming step, a protective film of corrosion inhibitor is applied to the metal specimen by means of the same procedure followed in the "Continuous Exposure Test," except that the exposure time is 1 hour and the filming inhibitor mix is one of the three fluids described below; in the second or rinsing step, the test specimens are transferred to new bottles containing fresh fluids of the same type used during the first step but containing no inhibitor, and then rotated on the wheel in the oven at 120° F. (for sour mixes) or 160° F. (for sweet mixes) for 1 hour; and finally, in the third or exposure step, the test specimens are transferred to new bottles containing no inhibitor but containing 10% fresh light gas oil and 90% brine, and gas of the same type used during the first and second steps, and then rotated on the wheel at 120° F. (sour) or 160° F. (sweet) for 72 hours.

The variables of inhibitor concentration and composition of well fluids are recognized in the Persistent Filming Test by employing the following three inhibited filming mixes: (a) 1 gallon of inhibitor per barrel of light gas oil (2.3 percent inhibitor); (b) 0.2 percent inhibitor concentration in a mixture of 10% light gas oil and 90% brine containing 10% sodium chloride and 0.5% calcium chloride; and (c) 1 gallon of inhibitor per barrel of brine (2.3% inhibitor). Mixes (a), (b) and (c), to simulate sweet and sour fluids, are saturated with carbon dioxide and hydrogen sulfide respectively.

The preferred corrosion inhibitor formulation "P" shown in Table I was evaluated by the previously described "Continuous Exposure Tests" and the "Persistent Filming Tests." Penetration rates expressed in mils per year for steel specimens in contact with the corrosion inhibiting fluids and blank runs made on unprotected steel specimens under six test conditions described are reported in Table II. A comparison of the test data shown in Table II for the preferred composition and the test data for the blank runs clearly demonstrates the effectiveness of the preferred composition in preventing the corrosion of metals in petroliferous well fluids, and particularly in a sour environment.

TABLE II

| | Corrosion penetration rate, mils/yr. | | | | | | |
|---|---|---|---|---|---|---|---|
| | Continuous exposure, 25 p.p.m. in 10/90 | | Persistent filming | | | | |
| | | | 2.3% filming conc. in brine | | 0.2% filming conc. in 10/90 [1] | | Average all tests |
| Inhibitor | Sweet | Sour | Sweet | Sour | Sweet | Sour | |
| "P" | 1.2 | 0.4 | 1.2 | 1.2 | 2.0 | 0.4 | 1.1 |
| Blank run | 14.8 | 50.8 | 14.8 | 50.8 | 14.8 | 50.8 | 32.8 |

[1] 10% light oil plus 90% synthetic brine.
"P" is preferred formulation shown in Table I.

The compositions and process of the invention have been described generally and by example with reference to particular compositions for purposes of clarity and illus-

We claim:
1. A high density corrosion inhibiting composition in percentage by weight

(a) from about 11 to 13 percent of an amide condensation product of polymeric fatty acid and 1-aminoalkyl-2-alkyl-2-imidazoline represented by the formula

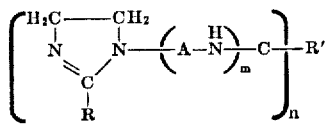

in which R is a tall oil fatty acid residual hydrocarbon radical containing from 17 to 32 carbon atoms; A is a bivalent ethylene radical; $m$ is an integer from 1 to 6; R' is a residual radical of a polymeric fatty acid containing from 15 to 70 carbon atoms and is selected from the group consisting of dimer, trimer, and higher molecular weight polymerized carboxylic fatty acids and mixtures thereof; and $n$ is an integer from 1 to 4;

(b) from about 55 to 65 weight percent of a high density polyhydric alcohol selected from the group comprising glyecrol, ethylene glycol, erythritol, or mixtures thereof;

(c) from about 15 to 25 weight percent of a high density alkylene carbonate selected from the group consisting of propylene carbonate, ethylene carbonate, of mixtures thereof; and (d) from about 7 to 9 weight percent of a stabilizer comprising 1-aminoalkyl-2-alkyl-2-imidazoline prepared by reacting a polyamine of the formula $$H_2N(A\text{---}NH)_xH$$

where A is an ethylene radical and $x$ is an integer from 2 to 7 with tall oil fatty acids.

2. The high density corrosion inhibiting composition of claim 1 wherein the high density polyhydric alcohol mixture in (b) consists of glyecrol in the amount of about 30–40 weight percent and ethylene glycol in the amount of about 15–25 weight percent; and the alkylene carbonate in (c) is propylene carbonate.

3. The corrosion inhibiting composition according to claim 1 in which the 1-aminoalkyl-2-alkyl-2-imidazoline of (a) is made by the reaction of a tall oil fatty acid selected from the group consisting of linoleic, conjugated linoleic, oleic, and stearic, and a polyalkylene polyamine selected from the group consisting of diethylenetriamine, triethylenetetramine, and tetraethylenepentamine; and the polymeric acid is a dicarboxylic acid having a molecular weight of about 600 and comprising approximately 70 to 76 percent by weight of dimerized linoleic acid.

4. A process of inhibiting corrosion of ferrous oil and gas well equipment in contact with sweet and sour petroliferous well fluids comprising, mixing said well fluids with the inhibiting composition of claim 1 to effect a minimum concentration by weight of inhibitor to well fluids of 10 parts per million.

References Cited
UNITED STATES PATENTS

| | | | |
|---|---|---|---|
| 2,468,163 | 4/1949 | Blair et al. | 252—8.55 |
| 2,785,127 | 3/1957 | Shock et al. | 252—8.55 |
| 2,822,330 | 2/1968 | Riggs et al. | 252—8.55 |
| 2,999,811 | 9/1961 | Schell et al. | 252—8.55 |
| 3,623,979 | 11/1971 | Maddox et al. | 252—8.55 |

HERBERT B. GUYNN, Primary Examiner

U.S. Cl. X.R.

21—2.5, 2.7; 252—392, 396

PO-1050
(5/69)

UNITED STATES PATENT OFFICE
CERTIFICATE OF CORRECTION

Patent No. 3,687,847          Dated August 29, 1972

Inventor(s) JIM MADDOX, JR. and WILLIAM SCHOEN

It is certified that error appears in the above-identified patent and that said Letters Patent are hereby corrected as shown below:

Claim 1 Formula:          Correct formula to show the following:

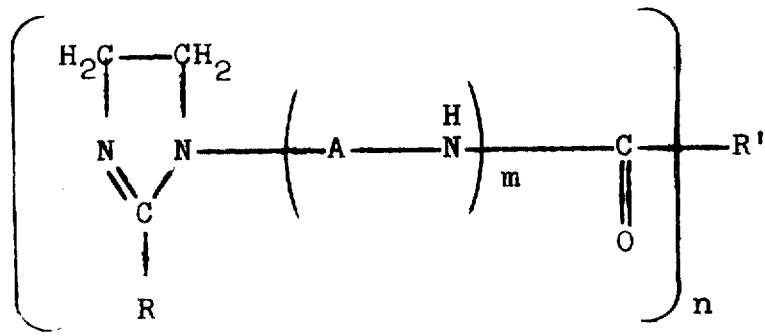

Signed and sealed this 20th day of February 1973.

(SEAL)
Attest:

EDWARD M. FLETCHER, JR.          ROBERT GOTTSCHALK
Attesting Officer          Commissioner of Patents